US012684471B2

(12) United States Patent
Agarwal et al.

(10) Patent No.: US 12,684,471 B2
(45) Date of Patent: Jul. 14, 2026

(54) METHOD AND SYSTEM FOR HANDLING REGISTERED PUBLIC LAND MOBILE NETWORK DURING DISASTER SITUATION IN WIRELESS NETWORK

(71) Applicant: Samsung Electronics Co., Ltd., Suwon-si (KR)

(72) Inventors: Aman Agarwal, Bangalore (IN); Lalith Kumar, Bangalore (IN); Kailash Kumar Jha, Bangalore (IN); Samiran Bhowmik, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 17/936,751

(22) Filed: Sep. 29, 2022

(65) Prior Publication Data

US 2023/0095734 A1 Mar. 30, 2023

(30) Foreign Application Priority Data

Sep. 29, 2021 (IN) .............................. 202141044101
Sep. 1, 2022 (IN) .............................. 202141044101

(51) Int. Cl.
H04W 8/04 (2009.01)
H04W 48/18 (2009.01)
(Continued)

(52) U.S. Cl.
CPC ............. H04W 48/18 (2013.01); H04W 8/04 (2013.01); H04W 4/90 (2018.02); H04W 84/042 (2013.01)

(58) Field of Classification Search
CPC ................................ H04W 48/18; H04W 8/04
(Continued)

(56) References Cited

U.S. PATENT DOCUMENTS

2014/0269525 A1* 9/2014 Li .......................... H04W 76/10
370/329
2017/0251071 A1* 8/2017 Kenjo ..................... H04L 67/52
(Continued)

FOREIGN PATENT DOCUMENTS

WO 2019/122494 A1 6/2019
WO 2020/218764 A1 10/2020

OTHER PUBLICATIONS

Samsung, "PLMN With disaster condition selection," C1-215872, 3GPP TSG-CT WG1 Meeting #132-e, E-meeting, Oct. 11-15, 2021, 6 pages.

(Continued)

*Primary Examiner* — Qutbuddin Ghulamali

(57) ABSTRACT

The disclosure relates to a 5G or 6G communication system for supporting a higher data transmission rate. Embodiments herein provide a method for handling a RPLMN during a disaster situation in a wireless network by a UE. In an embodiment, the method includes selecting RPLMN as PLMN with the disaster condition for accessing the disaster roaming services in response to determining that the RPLMN is included in a list of PLMNs with disaster condition for which disaster roaming services is offered by another PLMN and is allowable. In another embodiment, the method includes skipping the RPLMN and determining a PLMN with disaster condition for acessing the disaster roaming services in response to determining that the at least one PLMN is not included in the list of PLMNs with the disaster condition for which disaster roaming services is offered by the another PLMN or is not allowable.

20 Claims, 6 Drawing Sheets

(51) Int. Cl.
      *H04W 4/90*          (2018.01)
      *H04W 84/04*         (2009.01)

(58) Field of Classification Search
      USPC ......................................................... 455/433
      See application file for complete search history.

(56)                    References Cited

U.S. PATENT DOCUMENTS

2018/0176981 A1*   6/2018   Baer ..................... H04W 48/18
2023/0095734 A1*   3/2023   Agarwal ................. H04W 8/04
                                                              455/433

OTHER PUBLICATIONS

3GPP TR 24.811 V17.1.0 (Sep. 2021), Technical Report, 3rd Generation Partnership Project; Technical Specification Group Core Network and Terminals; Study on the support for minimization of service interruption; (Release 17), Sep. 2021, 112 pages.

3GPP TS 23.122 V17.5.0 (Dec. 2021), Technical Specification, 3rd Generation Partnership Project; Technical Specification Group Core Network and Terminals; Non-Access-Stratum (NAS) functions related to Mobile Station (MS) in idle mode (Release 17), Dec. 2021, 121 pages.

3GPP TS 23.502 V17.6.0 (Sep. 2022), Technical Specification, 3rd Generation Partnership Project; Technical Specification Group Services and System Aspects; Procedures for the 5G System (5GS); Stage 2 (Release 17), Sep. 2022, 748 pages.

3GPP TS 24.501 V17.8.0 (Sep. 2022), Technical Specification, 3rd Generation Partnership Project; Technical Specification Group Core Network and Terminals; Non-Access-Stratum (NAS) protocol for 5G System (5GS); Stage 3; (Release 17), Sep. 2022, 995 pages.

3GPP TS 25.304 V17.1.0 (Jun. 2022), Technical Specification, 3rd Generation Partnership Project; Technical Specification Group Radio Access Network; User Equipment (UE) procedures in idle mode and procedures for cell reselection in connected mode (Release 17), Jun. 2022, 58 pages.

3GPP TS 36.304 V17.1.0 (Jun. 2022), Technical Specification, 3rd Generation Partnership Project; Technical Specification Group Radio Access Network; Evolved Universal Terrestrial Radio Access (E-UTRA); User Equipment (UE) procedures in idle mode (Release 17), Jun. 2022, 65 pages.

3GPP TS 38.304 V17.1.0 (Jun. 2022), Technical Specification, 3rd Generation Partnership Project; Technical Specification Group Radio Access Network; NR; User Equipment (UE) procedures in Idle mode and RRC Inactive state (Release 17), Jun. 2022, 50 pages.

3GPP TS 43.022 V17.0.0 (Mar. 2022), Technical Specification, 3rd Generation Partnership Project; Technical Specification Group Radio Access Network; Functions related to Mobile Station (MS) in idle mode and group receive mode (Release 17), Mar. 2022, 24 pages.

3GPP TS 43.064 V17.0.0 (Mar. 2022), Technical Specification, 3rd Generation Partnership Project; Technical Specification Group Radio Access Network; General Packet Radio Service (GPRS); Overall description of the GPRS radio interface; Stage 2 (Release 17), Mar. 2022, 125 pages.

Supplementary European Search Report dated Oct. 21, 2024, in connection with European Application No. 22876915.4, 13 pages.

Ericsson, et al., "Automatic PLMN selection updates for MINT," C1-215138, 3GPP TSG-CT WG1 Meeting #131-e, E-meeting, Aug. 19-27, 2021, 15 pages.

LG Electronics, "Resolving ENs regarding security aspects," C1-21wwww, 3GPP TSG-CT WG1 Meeting #130-e, Electronic meeting, May 20-28, 2021, 11 pages.

"3rd Generation Partnership Project; Technical Specification Group Core Network and Terminals; Non-Access-Stratum (NAS) functions related to Mobile Station (MS) in idle mode (Release 17)", 3GPP TS 23.122 V17.4.0 (Sep. 2021), 106 pages.

International Search Report dated Jan. 31, 2023 in connection with International Patent Application No. PCT/KR2022/014690, 3 pages.

Written Opinion of the International Searching Authority dated Jan. 31, 2023 in connection with International Patent Application No. PCT/KR2022/014690, 4 pages.

* cited by examiner

S400

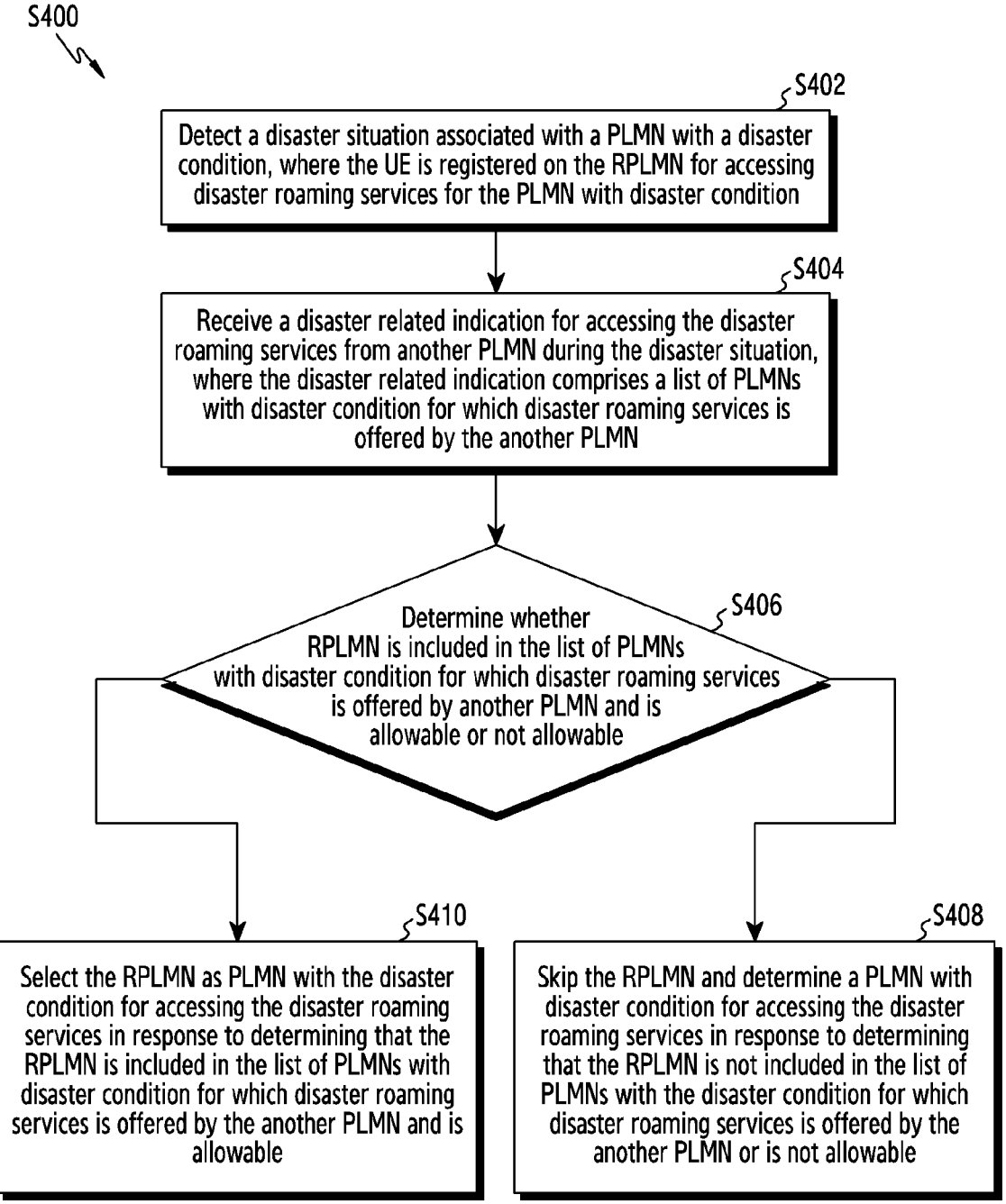

S402

Detect a disaster situation associated with a PLMN with a disaster condition, where the UE is registered on the RPLMN for accessing disaster roaming services for the PLMN with disaster condition

S404

Receive a disaster related indication for accessing the disaster roaming services from another PLMN during the disaster situation, where the disaster related indication comprises a list of PLMNs with disaster condition for which disaster roaming services is offered by the another PLMN

S406

Determine whether RPLMN is included in the list of PLMNs with disaster condition for which disaster roaming services is offered by another PLMN and is allowable or not allowable

S410

Select the RPLMN as PLMN with the disaster condition for accessing the disaster roaming services in response to determining that the RPLMN is included in the list of PLMNs with disaster condition for which disaster roaming services is offered by the another PLMN and is allowable

S408

Skip the RPLMN and determine a PLMN with disaster condition for accessing the disaster roaming services in response to determining that the RPLMN is not included in the list of PLMNs with the disaster condition for which disaster roaming services is offered by the another PLMN or is not allowable

FIG.4

METHOD AND SYSTEM FOR HANDLING REGISTERED PUBLIC LAND MOBILE NETWORK DURING DISASTER SITUATION IN WIRELESS NETWORK

CROSS-REFERENCE TO RELATED APPLICATIONS

This application is based on and derives the benefit of Indian Provisional Patent Application Number 202141044101 filed on 29th Sep., 2021 and of an Indian Complete Patent Application Number 202141044101, filed on Sep. 1, 2022, in the Indian Intellectual Property Office, the contents of which are incorporated herein by reference.

BACKGROUND

1. Field

The present disclosure relates to a field of wireless communication and networks, and more particularly to a method and a User Equipment (UE) to handle or skip a Registered Public Land Mobile Network (RPLMN) during a Mobile Information and Network Technologies (MINT) situation.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The principal object of the embodiments herein is to provide a method and UE to handle or skip Registered Public Land Mobile Network (RPLMN) during Mobile Information and Network Technologies (MINT) situation. The proposed methods can be used to perform quick search of PLMN with disaster condition.

Accordingly, the embodiment herein is to provide a method for handling a registered public land mobile network (RPLMN) during a disaster situation in a wireless network. The method includes detecting, by a User Equipment (UE) in the wireless network, the disaster situation associated with a public land mobile network (PLMN) with a disaster condition. The UE is registered on a RPLMN for accessing disaster roaming services for the PLMN with disaster condition. Further, the method includes receiving, by the UE, a disaster related indication for accessing the disaster roaming services from another PLMN during the disaster situation. The disaster related indication includes a list of PLMNs with disaster condition for which disaster roaming services is offered by the another PLMN. Further, the method includes determining, by the UE, whether the RPLMN is included in the list of PLMNs with disaster condition for which disaster roaming services is offered by the another PLMN and is allowable or not allowable. Further, the method includes performing, by the UE, one of selecting the RPLMN as PLMN with the disaster condition for accessing the disaster roaming services in response to determining that the RPLMN is included in the list of PLMNs with disaster condition for which disaster roaming services is offered by the another PLMN and is allowable, and skipping the RPLMN and determining a PLMN with disaster condition for accessing the disaster roaming services in response to determining that the RPLMN is not included in the list of PLMNs with the disaster condition for which disaster roaming services is offered by the another PLMN or is not allowable.

In an embodiment, determining, by the UE, the PLMN with the disaster condition for accessing the disaster roaming services includes receiving, by the UE, a list of PLMNs with the disaster condition for which the disaster roaming services are offered by the another PLMN broadcasted by a NG-RAN cell in the wireless network and the another PLMN is allowable, and selecting, by the UE, the PLMN with disaster condition for accessing the disaster roaming services based on following priority order a HPLMN when an EHPLMN list is not present or is empty, a highest priority EHPLMN that is available when the EHPLMN list is present, each PLMN in a "user controlled PLMN selector with access technology" data file in a SIM in a priority order, each PLMN in an "operator controlled PLMN selector with access technology" data file in a SIM in a priority order or stored in a ME in a priority order, and random PLMNs available.

In an embodiment, determining the RPLMN is allowable or not allowable includes determining, by the UE, whether the RPLMN is present in a forbidden PLMN list available at the UE, and determining, by the UE, one of: the RPLMN is allowable when the RPLMN is not present in the forbidden PLMN list available at the UE, and the RPLMN is not allowable when the RPLMN is present in the forbidden PLMN list available at the UE.

Accordingly, the embodiment herein is to provide a UE for handling a RPLMN during a disaster situation in a wireless network. The UE includes a RPLMN selection controller communicatively coupled to a memory and a processor. The RPLMN selection controller detects the disaster situation associated with a PLMN with a disaster condition. The UE is registered on RPLMN for accessing disaster roaming services for the PLMN with disaster condition. The RPLMN selection controller is configured to receive a disaster related indication for accessing the disaster roaming services from another PLMN during the disaster situation, where the disaster related indication includes a list of PLMNs with disaster condition for which disaster roaming services is offered by the another PLMN. Further, the RPLMN selection controller determines whether the RPLMN is included in the list of PLMNs with disaster condition for which disaster roaming services is offered by the another PLMN and is allowable or not allowable. Further, the RPLMN selection controller is configured to perform one of: select the RPLMN as PLMN with the disaster condition for accessing the disaster roaming services in response to determining that the RPLMN is included in the list of PLMNs with disaster condition for which disaster roaming services is offered by the another PLMN and is allowable, and skip the RPLMN and determining a PLMN with disaster condition for accessing the disaster roaming services in response to determining that the RPLMN is not included in the list of PLMNs with the disaster condition for which disaster roaming services is offered by the another PLMN or is not allowable.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments are illustrated in the accompanying drawings, throughout which like reference letters indicate corresponding parts in the various figures. The embodiments herein will be better understood from the following description with reference to the drawings, in which:

FIG. 4 is a flow chart illustrating a method for handling the RPLMN during the disaster situation in a wireless network, according to the embodiments as disclosed herein;

Throughout the drawings, it should be noted that like reference numbers are used to depict the same or similar elements, features, and structures.

DETAILED DESCRIPTION

Figure 1:
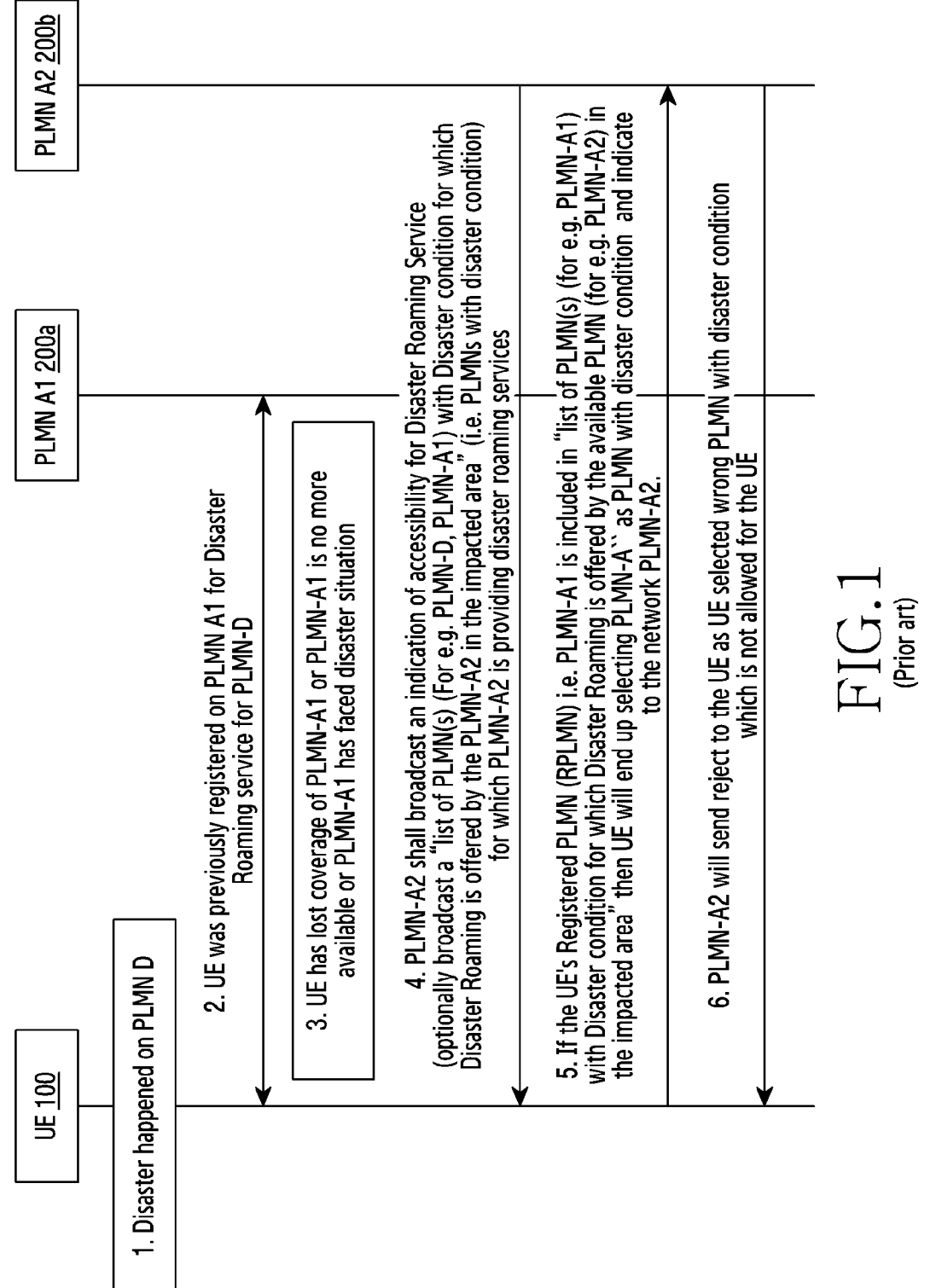
FIG. 1 illustrating a scenario of a UE initially registered for disaster roaming services on a PLMN-A1 goes out-of-service or has lost coverage of a current serving PLMN-A1, according to the prior arts.

The above-identified provisional patent applications are hereby incorporated by reference in their entirety. Before undertaking the description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Below are the abbreviations and definitions used in the patent description:

1) 5GMM—5GS Mobility Management
2) 5GS—5G System
3) AMF—Access and Mobility Management Function
4) Allowable PLMN: In the case of an MS operating in MS operation mode A or B, this is a PLMN which is not in the list of "forbidden PLMNs" in the MS. In the case of an MS operating in MS operation mode C or an MS not supporting A/Gb mode and not supporting Iu mode, this is a PLMN which is not in the list of "forbidden PLMNs" and not in the list of "forbidden PLMNs for GPRS service" in the MS.
5) Available PLMN: For GERAN A/Gb mode see 3GPP TS 43.022. For UTRAN see 3GPP TS 25.304. For E-UTRAN see 3GPP TS 36.304. For NG-RAN see 3GPP TS 36.304 and 3GPP TS 38.304. For cdma2000® 1xRTT and cdma2000® HRPD see 3GPP2 C.S0016.
6) Camped on a cell: The MS (ME if there is no SIM) has completed the cell selection/reselection process and has chosen a cell from which it plans to receive all available services. Note that the services may be limited, and that the PLMN or the SNPN may not be aware of the existence of the MS (ME) within the chosen cell.
7) EHPLMN: Any of the PLMN entries contained in the Equivalent HPLMN list.
8) Equivalent HPLMN list: To allow provision for multiple HPLMN codes, PLMN codes that are present within this list shall replace the HPLMN code derived from the IMSI for PLMN selection purposes. This list is stored on the USIM and is known as the EHPLMN list. The EHPLMN list may also contain the HPLMN code derived from the IMSI. If the HPLMN code derived from the IMSI is not present in the EHPLMN list then it shall be treated as a Visited PLMN for PLMN selection purposes.
9) High quality signal: The high quality signal limit is used in the PLMN selection procedure. It is defined in the appropriate AS specification: 3GPP TS 43.022 for the GSM radio access technology, 3GPP TS 25.304 for the UMTS radio access technology (FDD or TDD mode), 3GPP TS 36.304 for the E UTRAN radio access technology (WB-S1 mode, NB-S1 mode, WB-N1 mode or NB-N1 mode), 3GPP TS 36.304 and 3GPP TS 38.304 for the NG-RAN radio access technology. For 3GPP2 access technologies the high quality signal limit is defined in 3GPP2 C.S0011 for cdma2000® 1xRTT and in 3GPP2 C.S0033 for cdma2000® HRPD. A mobile station attempting to find a cell that supports EC-GSM-IoT (see 3GPP TS 43.064) does not use high quality signal limit in the PLMN selection procedure, i.e. for the purpose of PLMN selection, when attempting to find a cell that supports EC-GSM-IoT, any found cell supporting EC-GSM-IoT is considered to be received with high quality signal. A UE attempting to find a cell that supports enhanced coverage when operating in any WB-S1 or WB-N1 enhanced coverage mode does not use high quality signal limit in the PLMN selection procedure, i.e. for the purpose of PLMN selection, when attempting to find a cell that supports enhanced coverage, any found cell supporting enhanced coverage and satisfying the coverage specific quality signal limit defined for CE mode (see 3GPP TS 36.304) is considered to be received with high quality signal.

10) Home PLMN: This is a PLMN where the MCC and MNC of the PLMN identity match the MCC and MNC of the IMSI.

11) Registered PLMN (RPLMN): This is the PLMN on which certain LR outcomes have occurred. In a shared network the RPLMN is the PLMN defined by the PLMN identity of the CN operator that has accepted the LR.

12) Registration: This is the process of camping on a cell of the PLMN or the SNPN and doing any necessary LRs.

13) UPLMN: PLMN/access technology combination in the "User Controlled PLMN Selector with Access Technology" data file in the SIM (in priority order);

14) OPLMN: PLMN/access technology combination in the "Operator Controlled PLMN Selector with Access Technology" data file in the SIM (in priority order) or stored in the ME (in priority order).

15) Disaster Condition—This is the condition that a government decides when to initiate and terminate, e.g. a natural disaster. When this condition applies, users may have the opportunity to mitigate service interruptions and failures.

16) Disaster Inbound Roamer—A user that (a) cannot get service from the PLMN it would normally be served by, due to failure of service during a Disaster Condition, and (b) is able to register with other PLMNs.

17) Disaster Roaming—This is the special roaming policy that applies during a Disaster Condition.

18) PLMN with Disaster Condition—A PLMN to which a Disaster Condition applies.

The terms disaster based service, disaster roaming service and disaster inbound roaming are used interchangeably in this embodiment and have the same meaning.

In general, the purpose of a Mobile Information and Network Technologies (MINT) is to minimize interruption of service to users when a network to which these users are subscribed cannot provide service due to a disaster such as e.g. a fire, by enabling the users to obtain service on other networks, while at the same time protecting those other networks from congestion.

In a patent description, a PLMN D is subject to disaster and a PLMN A is alive and not subject to disaster.

FIG. 1 illustrating a scenario of a UE (100) initially registered for disaster roaming services on a PLMN-A1 goes out-of-service or has lost coverage of the current serving PLMN-A1, according to the prior arts. The UE (100) can be, for example, but not limited to a cellular phone, a smart phone, a Personal Digital Assistant (PDA), a tablet computer, a laptop computer, an Internet of Things (IoT), embedded systems, edge devices, a vehicle to everything (V2X) device or the like.

Referring to the FIG. 1, the UE (100), initially registered for disaster roaming services on a PLMN-A1 (200a) (PLMN providing disaster roaming services to the UE (100) on behalf of some PLMN-D), where PLMN-D is a PLMN with disaster condition, goes out-of-service or has lost coverage of the current serving PLMN-A1 (200a), and there is no available PLMN which is allowable and in a given area there is one or more PLMN A(s) (200a and 200b) (PLMN A2, PLMN A3, PLMN A4 etc),which are alive and broadcast an indication of accessibility for the disaster roaming service to the UE (100), can optionally broadcast a "list of PLMN(s) with Disaster condition for which Disaster Roaming is offered by the available PLMN in the impacted area".

If the UE's Registered PLMN (RPLMN) i.e., PLMN-A1 is included in "list of PLMN(s) (for e.g. PLMN-A1) with Disaster condition for which Disaster Roaming is offered by the available PLMN (for e.g. PLMN-A2) in the impacted area" (as disaster situation might have occurred on PLMN-A1) then UE will select RPLMN as the PLMN with disaster condition and indicate the same to the PLMN-A2 in registration request message. PLMN-A2 will send registration reject message to the UE because UE selected wrong PLMN with disaster condition(PLMN-A1) and PLMN-A2 cannot offer disaster roaming service to the UE.

In the description, the UE (100) was initially registered on PLMN A1 (200a) for disaster roaming service for the PLMN-D. The UE (100) lost coverage or went out-of-service. The PLMN A1 (200a) has faced disaster and is no more available. The PLMN A2 (200b) is available and not subject to disaster and providing disaster roaming services for PLMN-Al and PLMN-D.

Referring to FIG. 1, at 1, the UE (100) determines that the disaster is happened on the PLMN D. At 2, the UE (100) was previously registered on the PLMN A1 (200a) for the disaster roaming service for the PLMN-D. At 3, the UE (100) has lost coverage of the PLMN-A1 (200a) or the PLMN-A1 is no more available or PLMN-A1 has faced disaster situation. At 4, the PLMN-A2 (200b) shall broadcast an indication of accessibility for disaster roaming service (and optionally broadcast a "list of PLMN(s) (for e.g. PLMN-D, PLMN-A1) with Disaster condition for which Disaster Roaming is offered by the PLMN-A2 in the impacted area" (i.e., PLMNs with disaster condition) for which PLMN-A2 is providing disaster roaming services. At 5, if the UE's Registered PLMN (RPLMN) i.e., PLMN-A1 is included in "list of PLMN(s) (for e.g. PLMN-A1) with the disaster condition for which disaster roaming is offered by the available PLMN (for e.g. PLMN-A2) in the impacted area" then UE will select RPLMN as the PLMN with disaster condition and indicate the same to the PLMN-A2 in registration request message. At step 6, PLMN-A2 will send registration reject message to the UE because UE selected wrong PLMN with disaster condition (PLMN-A1) and PLMN-A2 cannot offer disaster roaming service to the UE. The RPLMN is always given priority by the UE (100) because it was the latest PLMN providing the service to the UE (100). Suddenly if the RPLMN is not available, the UE (100) will prioritize to search the PLMN which can provide disaster roaming service on behalf of RPLMN. But here the situation is that the RPLMN itself was providing disaster roaming service and selecting this can have undesirable effects because the new (another) PLMN providing disaster roaming service may not allow the UE (100) to get the service, which may lead for the UE (100) to remain in no service for considerable duration.

Thus, it is desired to address the above mentioned disadvantages or other shortcomings or at least provide a useful alternative.

Accordingly, the embodiment herein is to provide a method for handling a RPLMN during a disaster situation in a wireless network. The method includes detecting, by a UE in the wireless network, the disaster situation associated with a PLMN with a disaster condition. The UE is registered on RPLMN for accessing disaster roaming services for the PLMN with disaster condition. Further, the method includes receiving, by the UE, a disaster related indication for accessing the disaster roaming services from another PLMN during the disaster situation. The disaster related indication includes a list of PLMNs with disaster condition for which disaster roaming services is offered by the another PLMN. Further, the method includes determining, by the UE, whether the RPLMN is included in the list of PLMNs with disaster condition for which disaster roaming services is offered by the another PLMN and is allowable or not allowable. Further, the method includes performing, by the UE, one of selecting the RPLMN as PLMN with the disaster condition for accessing the disaster roaming services in response to determining that the RPLMN is included in the list of PLMNs with disaster condition for which disaster roaming services is offered by the another PLMN and is allowable, and skipping the RPLMN and determining a PLMN with disaster condition for accessing the disaster roaming services in response to determining that the RPLMN is not included in the list of PLMNs with the disaster condition for which disaster roaming services is offered by the another PLMN or is not allowable.

In an embodiment, the UE can identify that the RPLMN is the PLMN which was providing disaster roaming service by looking at its forbidden PLMN lists. If the RPLMN is part of forbidden PLMN lists this means that previously UE was receiving disaster roaming service from the FPLMN. The UE while determining PLMN with disaster condition will check if RPLMN is part of FPLMN list. If RPLMN is not part of FPLMN list (i.e. it is allowable) then UE will select RPLMN as PLMN with disaster condition. Otherwise, the UE will skip RPLMN and select next higher priority PLMN as the PLMN with disaster condition. The proposed methods can be used to perform quick search of PLMN with disaster condition without wasting resources.

Figure 2:
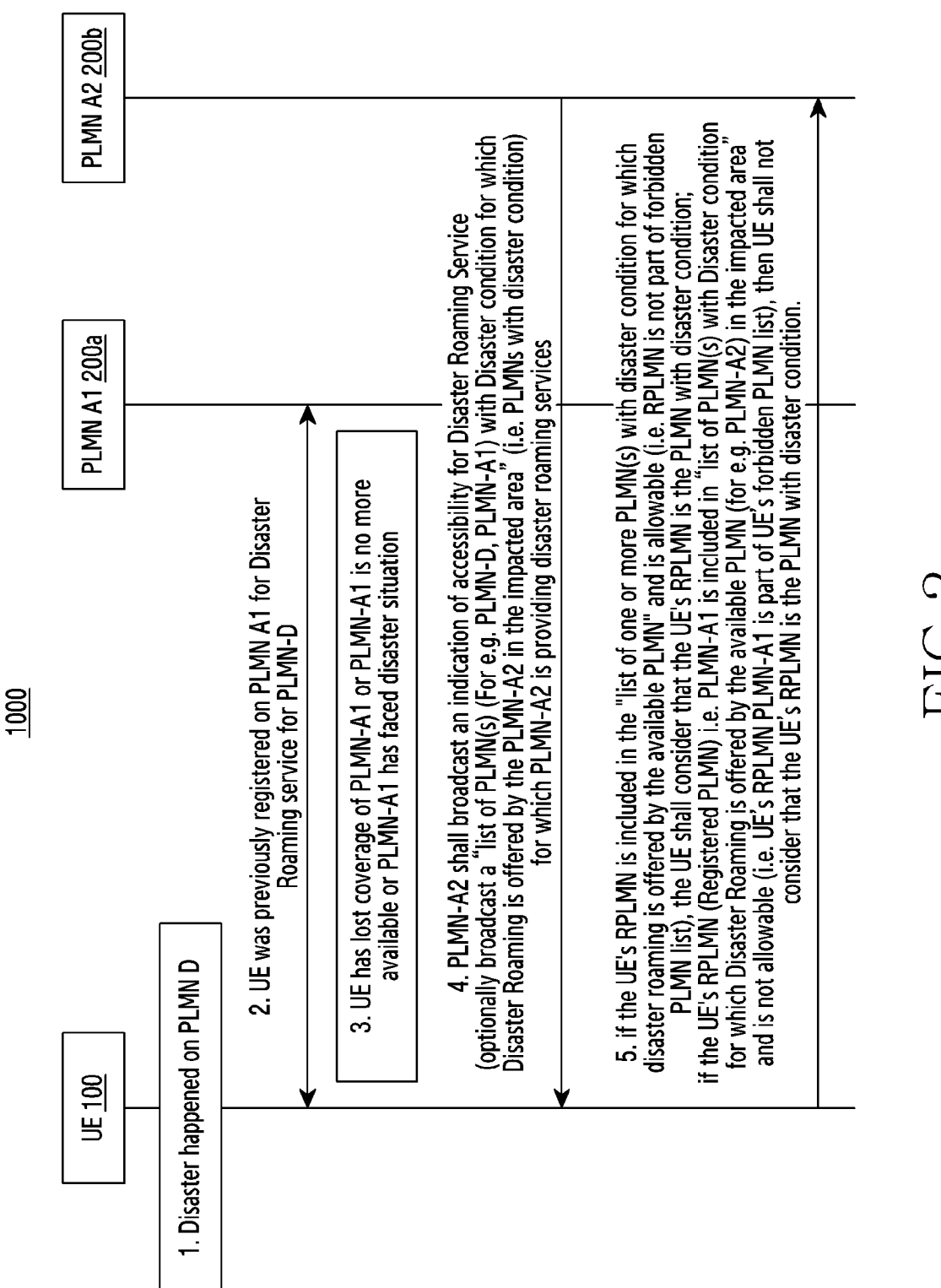
FIG. 2 illustrating a scenario of a UE initially registered for disaster roaming services on a PLMN-A1 goes out-of-service or has lost coverage of the current serving PLMN-A1, according to the embodiments as disclosed herein.
Figure 3:
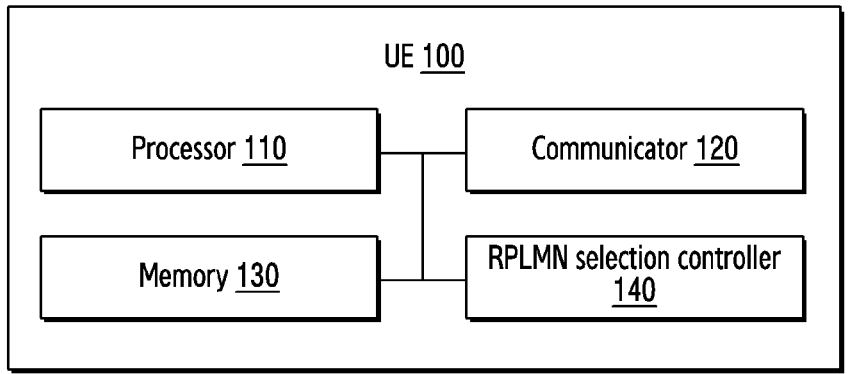
FIG. 3 shows various hardware components of a UE, according to the embodiments as disclosed herein.

Referring now to the drawings and more particularly to FIGS. 2 through 4, where similar reference characters denote corresponding features consistently throughout the figures, there are shown preferred embodiments.

FIG. 2 illustrating a scenario of the UE (100) initially registered for disaster roaming services on the PLMN-A1 (200*a*) goes out-of-service or has lost coverage of the current serving PLMN-A1 (200*a*) according to the embodiments as disclosed herein.

Referring to the FIG. 2, the UE (100), initially registered for disaster roaming services on the PLMN-A1 (200*a*) (PLMN providing disaster roaming services to the UE (100) on behalf of some PLMN-D), goes out-of-service or has lost coverage of the current serving PLMN-A1, and there is no available PLMN which is allowable and in a given area there is one or more PLMN A(s) (200) (PLMN A2, PLMN A3, PLMN A4 etc),which are alive and broadcast an indication of accessibility for Disaster Roaming Service to the UE, can optionally broadcast a "list of PLMN(s) with Disaster condition for which Disaster Roaming is offered by the available PLMN (for e.g. PLMN-A2) in the impacted area".

At switch on, or following recovery from lack of coverage, if there is no available PLMN which is allowable and in a given area there is one or more PLMN A(s)(PLMN-A2, PLMN-A3, PLMN-A4 etc),which are alive and broadcast an indication of accessibility for Disaster Roaming Service to the UE (200), can optionally broadcast a "list of one of more PLMN(s) with Disaster condition for which Disaster Roaming is offered by the available PLMN (for e.g. PLMN-A2)", then the UE (100) selects and attempts registration on PLMN/NG-RAN combinations to select a PLMN for disaster roaming if the NG-RAN cell of the PLMN:

a. Broadcasts the disaster related indication; or b. Broadcasts a "list of one or more PLMN(s) with disaster condition for which disaster roaming is offered by the available PLMN" including the PLMN with disaster condition determined as follows:

i. if the UE's RPLMN is included in the "list of one or more PLMN(s) with disaster condition for which disaster roaming is offered by the available PLMN" and is allowable (i.e. RPLMN is not part of forbidden PLMN list), the UE (100) shall consider that the UE's RPLMN is the PLMN with disaster condition; or ii. if the UE's RPLMN is not included in any "list of one or more PLMN(s) with disaster condition for which disaster roaming is offered by the available PLMN" broadcast by any NG-RAN cell, the UE (100) shall determine the PLMN with disaster condition from PLMNs:

1. in the "list of one or more PLMN(s) with disaster condition for which disaster roaming is offered by the available PLMN" broadcast by any NG-RAN cell; and 2. which are allowable; in the following order:

3. either the HPLMN (if the EHPLMN list is not present or is empty) or the highest priority EHPLMN that is available (if the EHPLMN list is present);

4. each PLMN in the "User Controlled PLMN Selector with Access Technology" data file in the SIM (in priority order);

5. each PLMN in the "Operator Controlled PLMN Selector with Access Technology" data file in the SIM (in priority order) or stored in the ME (in priority order); and 6. other PLMNs.

In yet another embodiment, if the UE's RPLMN (Registered PLMN) i.e. PLMN-A1 is included in "list of PLMN(s) with Disaster condition for which Disaster Roaming is offered by the available PLMN (for e.g. PLMN-A2)" and is not allowable (i.e. UE's RPLMN PLMN-A1 is present in the UE's forbidden PLMN list), then the UE (100) shall not consider the UE's RPLMN as the PLMN with disaster condition. The UE (100) shall ignore or not select UE's RPLMN as the PLMN with disaster condition.

In yet another embodiment, if the UE's RPLMN (Registered PLMN) i.e. PLMN-A1 is not allowable (i.e. UE's RPLMN PLMN-A1 is present in the UE's forbidden PLMN list), then the UE (100) shall not consider UE's RPLMN as the PLMN with disaster condition when the UE (100) selects and attempts registration for disaster roaming service on the PLMN which broadcasts an indication of accessibility for Disaster Roaming Service to the UE (100).

In yet another embodiment, at switch-on or following recovery from lack of coverage, if the UE's Registered PLMN (RPLMN i.e. PLMN-A1 in this case) was providing disaster roaming service to the UE (100) before switch-off or before lack of coverage, the UE (100) shall first look for a PLMN which provides normal service following logic the priority as defined in 23.122. If UE (100) doesn't find a PLMN, then the UE (100) shall trigger a PLMN selection procedure for registering for disaster roaming services. The UE (100) shall ignore the RPLMN (or delete the RPLMN) and shall not consider the RPLMN as the PLMN with disaster condition if there is no available PLMN which is allowable and in a given area, there are one or more PLMN(s) which are available and broadcast an indication of accessibility for Disaster Roaming Service to the UE (100).

In the description, the UE (100) was initially registered on PLMN A1 for Disaster Roaming service for PLMN-D. The UE (100) lost coverage or went out-of-service. The PLMN A1 has faced disaster and is no more available. PLMN A2 is available and not subject to disaster and providing disaster roaming services for PLMN-A1 and PLMN-D.

As shown in FIG. 2, at 1, the UE (100) detects that the disaster is happened on the PLMN D. At 2, the UE (100) was previously registered on the PLMN A1 (200a) for the disaster roaming service for PLMN-D. At 3, the UE (100) has lost coverage of the PLMN-A1 (200a) or the PLMN-A1 (200a) is no more available or the PLMN-A1 (200a) has faced disaster situation. At 4, the PLMN-A2 (200b) shall broadcast an indication of accessibility for the disaster roaming service (and optionally broadcast a "list of PLMN (s) (For e.g. PLMN-D, PLMN-A1) with Disaster condition for which Disaster Roaming is offered by the PLMN-A2 in the impacted area" (i.e., the PLMNs with disaster condition) for which PLMN-A2 is providing disaster roaming services.

At 5, if the UE's RPLMN is included in the "list of one or more PLMN(s) with disaster condition for which disaster roaming is offered by the available PLMN" and is allowable (i.e. RPLMN is not part of forbidden PLMN list), the UE (100) shall consider that the UE's RPLMN is the PLMN with disaster condition. In another embodiment, if the UE's RPLMN (Registered PLMN) i.e., PLMN-A1 is included in "list of PLMN(s) with the disaster condition for which the disaster roaming is offered by the available PLMN (for e.g. PLMN-A2) in the impacted area" and is not allowable (i.e., UE's RPLMN PLMN-A1 is part of UE's forbidden PLMN list), then the UE (100) shall not consider that the UE's RPLMN is the PLMN with the disaster condition.

FIG. 3 shows various hardware components of the UE (100), according to the embodiments as disclosed herein. In an embodiment, the UE (100) includes a processor (110), a communicator (120), a memory (130) and a RPLMN selection controller (140). The processor (110) is coupled with the communicator (120), the memory (130) and the RPLMN selection controller (140).

The RPLMN selection controller (140) detects the disaster situation associated with the PLMN with the disaster condition. The UE (100) is registered on RPLMN for accessing disaster roaming services for the PLMN with disaster condition. Further, the RPLMN selection controller (140) receives the disaster related indication for accessing the disaster roaming services from another PLMN during the disaster situation, where the disaster related indication includes the list of PLMNs with disaster condition for which disaster roaming services is offered by the another PLMN.

Further, the RPLMN selection controller (140) determines whether the RPLMN is included in the list of PLMNs with disaster condition for which disaster roaming services is offered by the another PLMN and is allowable or not allowable. In an embodiment, the RPLMN selection controller (140) determines whether the RPLMN is present in a forbidden PLMN list available at the UE (100). Further, the RPLMN selection controller (140) determine one of: the RPLMN is allowable when the RPLMN is not present in the forbidden PLMN list available at the UE (100), and the RPLMN is not allowable when the RPLMN is present in the forbidden PLMN list available at the UE (100).

In an embodiment, in response to determining that the RPLMN is included in the list of PLMNs with disaster condition for which disaster roaming services is offered by the another PLMN and is allowable, the RPLMN selection controller (140) selects the RPLMN as PLMN with the disaster condition for accessing the disaster roaming services. In another embodiment, in response to determining that the RPLMN is not included in the list of PLMNs with the disaster condition for which disaster roaming services is offered by the another PLMN or is not allowable, the RPLMN selection controller (140) skips the RPLMN and determine a PLMN with disaster condition for accessing the disaster roaming services.

In an embodiment, the PLMN with disaster condition for accessing the disaster roaming services is determined by receiving a list of PLMNs with the disaster condition for which the disaster roaming services are offered by the another PLMN broadcasted by a NG-RAN cell in the wireless network and the another PLMN is allowable and selecting the PLMN with disaster condition for accessing the disaster roaming services based on following priority order: 1) a HPLMN when an EHPLMN list is not present or is empty, 2) a highest priority EHPLMN that is available when the EHPLMN list is present, 3) each PLMN in a "User Controlled PLMN Selector with Access Technology" data file in a SIM in a priority order, 4) each PLMN in an "Operator Controlled PLMN Selector with Access Technology" data file in a SIM in a priority order or stored in a ME in a priority order, and 5) random PLMNs available.

The RPLMN selection controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 3 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100). In addition, the UE (100) corresponds to the UE of the FIG. 5.

FIG. 4 is a flow chart (S400) illustrating a method for handling the RPLMN during the disaster situation in the wireless network (1000), according to the embodiments as disclosed herein. The operations (S402-S410) are handled by the RPLMN selection controller (140).

At S402, the method includes detecting the disaster situation associated with the PLMN with the disaster condition. The UE (100) is registered on the RPLMN for accessing disaster roaming services for the PLMN with disaster condition. The RPLMN is the RPLMN At S404, the method includes receiving the disaster related indication for accessing the disaster roaming services from the another PLMN during the disaster situation, where the disaster related indication comprises the list of PLMNs with disaster condition for which disaster roaming services is offered by the another PLMN. At S406, the method includes determining whether the RPLMN is included in the list of PLMNs with disaster condition for which disaster roaming services is offered by the another PLMN and is allowable or not allowable.

At S408, the method includes selecting the RPLMN as PLMN with the disaster condition for accessing the disaster roaming services in response to determining that the RPLMN is included in the list of PLMNs with disaster condition for which disaster roaming services is offered by the another PLMN and is allowable. At S410, the method includes skipping the RPLMN and determining the PLMN with disaster condition for accessing the disaster roaming services in response to determining that the RPLMN is not included in the list of PLMNs with the disaster condition for which disaster roaming services is offered by the another PLMN or is not allowable.

The various actions, acts, blocks, steps, or the like in the flow charts (S400) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Figure 5:
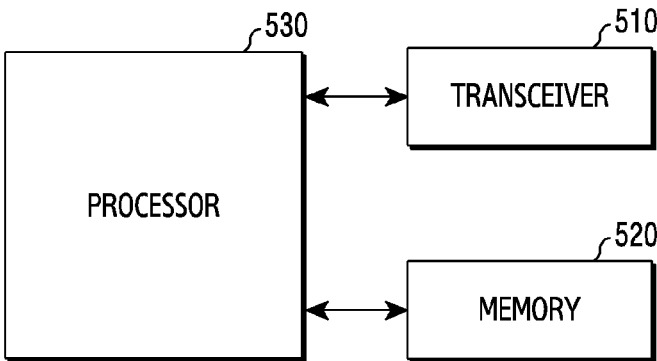
FIG. 5 illustrates a structure of a UE according to an embodiment of the disclosure.

FIG. 5 illustrates a structure of a UE according to an embodiment of the disclosure.

As shown in FIG. 5, the UE according to an embodiment may include a transceiver 510, a memory 520, and a processor 530. The transceiver 510, the memory 520, and the processor 530 of the UE may operate according to a communication method of the UE described above. However, the components of the UE are not limited thereto. For example, the UE may include more or fewer components than those described above. In addition, the processor 530, the transceiver 510, and the memory 520 may be implemented as a single chip. Also, the processor 530 may include at least one processor. Furthermore, the UE of FIG. 5 corresponds to the UE of the FIG. 3.

The transceiver 510 collectively refers to a UE receiver and a UE transmitter, and may transmit/receive a signal to/from a base station or a network entity. The signal transmitted or received to or from the base station or a network entity may include control information and data. The transceiver 510 may include a RF transmitter for up-converting and amplifying a frequency of a transmitted signal, and a RF receiver for amplifying low-noise and down-converting a frequency of a received signal. However, this is only an example of the transceiver 510 and components of the transceiver 510 are not limited to the RF transmitter and the RF receiver.

Also, the transceiver 510 may receive and output, to the processor 530, a signal through a wireless channel, and transmit a signal output from the processor 530 through the wireless channel.

The memory 520 may store a program and data required for operations of the UE. Also, the memory 520 may store control information or data included in a signal obtained by the UE. The memory 520 may be a storage medium, such as read-only memory (ROM), random access memory (RAM), a hard disk, a CD-ROM, and a DVD, or a combination of storage media.

The processor 530 may control a series of processes such that the UE operates as described above. For example, the transceiver 510 may receive a data signal including a control signal transmitted by the base station or the network entity, and the processor 530 may determine a result of receiving the control signal and the data signal transmitted by the base station or the network entity.

Figure 6:
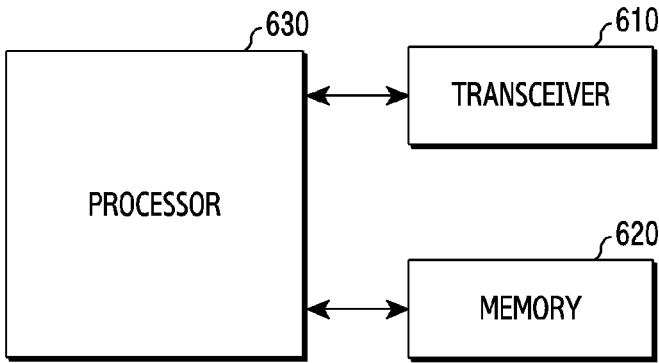
FIG. 6 illustrates a structure of a base station according to an embodiment of the disclosure.

FIG. 6 illustrates a structure of a base station according to an embodiment of the disclosure.

As shown in FIG. 6, the base station according to an embodiment may include a transceiver 610, a memory 620, and a processor 630. The transceiver 610, the memory 620, and the processor 630 of the base station may operate according to a communication method of the base station described above. However, the components of the base station are not limited thereto. For example, the base station may include more or fewer components than those described above. In addition, the processor 630, the transceiver 610, and the memory 620 may be implemented as a single chip. Also, the processor 630 may include at least one processor.

The transceiver 610 collectively refers to a base station receiver and a base station transmitter, and may transmit/receive a signal to/from a terminal(UE) or a network entity. The signal transmitted or received to or from the terminal or a network entity may include control information and data. The transceiver 610 may include a RF transmitter for up-converting and amplifying a frequency of a transmitted signal, and a RF receiver for amplifying low-noise and down-converting a frequency of a received signal. However, this is only an example of the transceiver 610 and components of the transceiver 610 are not limited to the RF transmitter and the RF receiver.

Also, the transceiver 610 may receive and output, to the processor 630, a signal through a wireless channel, and transmit a signal output from the processor 630 through the wireless channel.

The memory 620 may store a program and data required for operations of the base station. Also, the memory 620 may store control information or data included in a signal obtained by the base station. The memory 620 may be a storage medium, such as read-only memory (ROM), random access memory (RAM), a hard disk, a CD-ROM, and a DVD, or a combination of storage media.

The processor 630 may control a series of processes such that the base station operates as described above. For example, the transceiver 610 may receive a data signal including a control signal transmitted by the terminal, and the processor 630 may determine a result of receiving the control signal and the data signal transmitted by the terminal.

In one embodiment, a method is provided. A method performed by UE in a wireless communication system, the method includes receiving, from a base station, information on at least one first public land mobile network (PLMN) with disaster condition for which disaster roaming is offered, identifying that a registered PLMN (RPLMN) of the UE is not included in the at least one first PLMN or the RPLMN of the UE is forbidden PLMN, and transmitting, to the base station, a registration request message including a second PLMN as a PLMN with disaster condition, wherein the second PLMN is different from the RPLMN.

In one embodiment, a method is provided. The method includes wherein, the information includes a list of the at least one first PLMN with the disaster condition, and the information broadcasted by a next generation radio access network(NG-RAN) cell.

In one embodiment, a method is provided. The method includes wherein, the second PLMN is included in the list of the at least one first PLMN with the disaster condition for which the disaster roaming is offered and is allowable.

In one embodiment, a method is provided. The method includes wherein, the second PLMN is selected in following order: first, a Home PLMN (HPLMN) when an Equivalent HPLMN (EHPLMN) list is not present or is empty, second, a highest priority EHPLMN that is available when the EHPLMN list is present, third, each PLMN in a "user controlled PLMN selector with access technology" data file in a Subscriber Identity Module (SIM) in a priority order, fourth, each PLMN in an "operator controlled PLMN selector with access technology" data file in a SIM in a priority order or stored in a mobile Equipment (ME) in a priority order, and fifth, random PLMNs available.

In one embodiment, a method is provided. The method includes wherein, the information includes a disaster related indication for indicating one of the at least one first PLMN with the disaster condition, and the information broadcasted by a next generation radio access network(NG-RAN) cell.

In one embodiment, a method is provided. A method performed by base station in a wireless communication system, the method includes transmitting, to a user equipment (UE), information on at least one first public land mobile network (PLMN) with disaster condition for which disaster roaming is offered, wherein a registered PLMN (RPLMN) of the UE is not included in the at least one first PLMN or the RPLMN of the UE is forbidden PLMN; and receiving, from the UE, a registration request message including a second PLMN as a PLMN with disaster condition, wherein the second PLMN is different from the RPLMN.

In one embodiment, a method is provided. The method includes wherein, the information includes a list of the at least one first PLMN with the disaster condition, and the information broadcasted by a next generation radio access network(NG-RAN) cell.

In one embodiment, a method is provided. The method includes wherein, the second PLMN is included in the list of the at least one first PLMN with the disaster condition for which the disaster roaming is offered and is allowable.

In one embodiment, a method is provided. The method includes wherein, the second PLMN is selected in following order: first, a Home PLMN (HPLMN) when an Equivalent HPLMN (EHPLMN) list is not present or is empty, second, a highest priority EHPLMN that is available when the EHPLMN list is present, third, each PLMN in a "user controlled PLMN selector with access technology" data file in a Subscriber Identity Module (SIM) in a priority order, fourth, each PLMN in an "operator controlled PLMN selector with access technology" data file in a SIM in a priority order or stored in a mobile Equipment (ME) in a priority order, and fifth, random PLMNs available.

In one embodiment, a method is provided. The method includes wherein, the information includes a disaster related indication for indicating one of the at least one first PLMN with the disaster condition, and the information broadcasted by a next generation radio access network(NG-RAN) cell.

In one embodiment, a UE is provided. The UE comprises a transceiver, and at least one processor coupled with the transceiver and configured to: receive, from a base station, information on at least one first public land mobile network (PLMN) with disaster condition for which disaster roaming is offered, identify that a registered PLMN (RPLMN) of the UE is not included in the at least one first PLMN or the RPLMN of the UE is forbidden PLMN, and transmit, to the base station, a registration request message including a second PLMN as a PLMN with disaster condition, wherein the second PLMN is different from the RPLMN.

In one embodiment, a UE is provided. The UE comprises wherein, the information includes a list of the at least one first PLMN with the disaster condition, and the information broadcasted by a next generation radio access network(NG-RAN) cell.

In one embodiment, a UE is provided. The UE comprises wherein, the second PLMN is included in the list of the at least one first PLMN with the disaster condition for which the disaster roaming is offered and is allowable.

In one embodiment, a UE is provided. The UE comprises wherein, the second PLMN is selected in following order: first, a Home PLMN (HPLMN) when an Equivalent HPLMN (EHPLMN) list is not present or is empty, second, a highest priority EHPLMN that is available when the EHPLMN list is present, third, each PLMN in a "user controlled PLMN selector with access technology" data file in a Subscriber Identity Module (SIM) in a priority order, fourth, each PLMN in an "operator controlled PLMN selector with access technology" data file in a SIM in a priority order or stored in a mobile Equipment (ME) in a priority order, and fifth, random PLMNs available.

In one embodiment, a UE is provided. The UE comprises wherein, the information includes a disaster related indication for indicating one of the at least one first PLMN with the disaster condition, and the information broadcasted by a next generation radio access network(NG-RAN) cell.

In one embodiment, a base station is provided. in wireless communication, the base station comprises a transceiver, and at least one processor coupled with the transceiver and configured to: transmit, to a user equipment (UE), information on at least one first public land mobile network (PLMN) with disaster condition for which disaster roaming is offered, wherein a registered PLMN (RPLMN) of the UE is not included in the at least one first PLMN or the RPLMN of the UE is forbidden PLMN, and receive, from the UE, a registration request message including a second PLMN as a PLMN with disaster condition, wherein the second PLMN is different from the RPLMN.

In one embodiment, a base station is provided. the base station comprises wherein, the information includes a list of the at least one first PLMN with the disaster condition, and the information broadcasted by a next generation radio access network(NG-RAN) cell.

In one embodiment, a base station is provided. the base station comprises wherein, the second PLMN is included in the list of the at least one first PLMN with the disaster condition for which the disaster roaming is offered and is allowable.

In one embodiment, a base station is provided. the base station comprises wherein, the second PLMN is selected in following order: first, a Home PLMN (HPLMN) when an Equivalent HPLMN (EHPLMN) list is not present or is empty, second, a highest priority EHPLMN that is available when the EHPLMN list is present, third, each PLMN in a "user controlled PLMN selector with access technology" data file in a Subscriber Identity Module (SIM) in a priority order, fourth, each PLMN in an "operator controlled PLMN selector with access technology" data file in a SIM in a priority order or stored in a mobile Equipment (ME) in a priority order, and fifth, random PLMNs available.

In one embodiment, a base station is provided. the base station comprises wherein, the information includes a disaster related indication for indicating one of the at least one first PLMN with the disaster condition, and the information broadcasted by a next generation radio access network(NG-RAN) cell.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) in a wireless communication system, the method comprising:
   receiving, from a base station, a list of at least one first public land mobile network (PLMN) with disaster condition for which disaster roaming is offered;
   identifying whether a registered PLMN (RPLMN) of the UE is included in the list of the at least one first PLMN and is allowable; and
   transmitting, to the base station, a registration request message including a second PLMN as a PLMN with disaster condition.

2. The method of claim 1, wherein the list is broadcast by a next generation radio access network (NG-RAN) cell.

3. The method of claim 1, wherein, the second PLMN is selected in following order:
   first, a Home PLMN (HPLMN) when an Equivalent HPLMN (EHPLMN) list is not present or is empty,
   second, a highest priority EHPLMN that is available when the EHPLMN list is present,
   third, each PLMN in a "user controlled PLMN selector with access technology" data file in a Subscriber Identity Module (SIM) in a priority order, fourth, each PLMN in an "operator controlled PLMN selector with access technology" data file in a SIM in a priority order or stored in a mobile Equipment (ME) in a priority order, and fifth, random PLMNs available.

4. The method of claim 1, wherein, in case that the RPLMN is in the list of the at least one first PLMN and is allowable, the second PLMN includes the RPLMN.

5. The method of claim 1, wherein, in case that the RPLMN is now allowable, the second PLMN does not include the RPLMN.

6. A method performed by a base station in a wireless communication system, the method comprising:

transmitting, to a user equipment (UE), a list of at least one first public land mobile network (PLMN) with disaster condition for which disaster roaming is offered; and receiving, from the UE, a registration request message including a second PLMN as a PLMN with disaster condition, wherein the second PLMN is based on whether a registered PLMN (RPLMN) of the UE is included in the list of the at least one first PLMN and is allowable.

7. The method of claim 6, wherein the list is broadcast by a next generation radio access network (NG-RAN) cell.

8. The method of claim 6, wherein, the second PLMN is selected in following order:

first, a Home PLMN (HPLMN) when an Equivalent HPLMN (EHPLMN) list is not present or is empty, second, a highest priority EHPLMN that is available when the EHPLMN list is present, third, each PLMN in a "user controlled PLMN selector with access technology" data file in a Subscriber Identity Module (SIM) in a priority order, fourth, each PLMN in an "operator controlled PLMN selector with access technology" data file in a SIM in a priority order or stored in a mobile Equipment (ME) in a priority order, and fifth, random PLMNs available.

9. The method of claim 6, wherein, in case that the RPLMN is in the list of the at least one first PLMN and is allowable, the second PLMN includes the RPLMN.

10. The method of claim 6, wherein, in case that the RPLMN is now allowable, the second PLMN does not include the RPLMN.

11. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station, a list of at least one first public land mobile network (PLMN) with disaster condition for which disaster roaming is offered, identify whether a registered PLMN (RPLMN) of the UE is included in the list of the at least one first PLMN and is allowable, and transmit, to the base station, a registration request message including a second PLMN as a PLMN with disaster condition.

12. The UE of claim 11, wherein the list is broadcast by a next generation radio access network (NG-RAN) cell.

13. The UE of claim 11, wherein, the second PLMN is selected in following order:

first, a Home PLMN (HPLMN) when an Equivalent HPLMN (EHPLMN) list is not present or is empty, second, a highest priority EHPLMN that is available when the EHPLMN list is present, third, each PLMN in a "user controlled PLMN selector with access technology" data file in a Subscriber Identity Module (SIM) in a priority order, fourth, each PLMN in an "operator controlled PLMN selector with access technology" data file in a SIM in a priority order or stored in a mobile Equipment (ME) in a priority order, and fifth, random PLMNs available.

14. The UE of claim 11, wherein, in case that the RPLMN is in the list of the at least one first PLMN and is allowable, the second PLMN includes the RPLMN.

15. The UE of claim 11, wherein, in case that the RPLMN is now allowable, the second PLMN does not include the RPLMN.

16. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a user equipment (UE), a list of at least one first public land mobile network (PLMN) with disaster condition for which disaster roaming is offered, and receive, from the UE, a registration request message including a second PLMN as a PLMN with disaster condition, wherein the second PLMN is based on whether a registered PLMN (RPLMN) of the UE is included in the list of the at least one first PLMN and is allowable.

17. The base station of claim 16, wherein the list is broadcast by a next generation radio access network (NG-RAN) cell.

18. The base station of claim 16, wherein, the second PLMN is selected in following order:

first, a Home PLMN (HPLMN) when an Equivalent HPLMN (EHPLMN) list is not present or is empty, second, a highest priority EHPLMN that is available when the EHPLMN list is present, third, each PLMN in a "user controlled PLMN selector with access technology" data file in a Subscriber Identity Module (SIM) in a priority order, fourth, each PLMN in an "operator controlled PLMN selector with access technology" data file in a SIM in a priority order or stored in a mobile Equipment (ME) in a priority order, and fifth, random PLMNs available.

19. The base station of claim 16, wherein, in case that the RPLMN is in the list of the at least one first PLMN and is allowable, the second PLMN includes the RPLMN.

20. The base station of claim 16, wherein, in case that the RPLMN is now allowable, the second PLMN does not include the RPLMN.

* * * * *